United States Patent
Wilder et al.

(10) Patent No.: US 9,818,284 B1
(45) Date of Patent: Nov. 14, 2017

(54) WATER ACTIVATED GPS-BASED BEACON

(71) Applicants: Richard Wilder, Port St. Lucie, FL (US); Karlene Wilder, Port St. Lucie, FL (US)

(72) Inventors: Richard Wilder, Port St. Lucie, FL (US); Karlene Wilder, Port St. Lucie, FL (US)

( * ) Notice: Subject to any disclaimer, the term of this patent is extended or adjusted under 35 U.S.C. 154(b) by 0 days.

(21) Appl. No.: 15/402,301

(22) Filed: Jan. 10, 2017

(51) Int. Cl.
| | |
|---|---|
| *G08B 1/08* | (2006.01) |
| *G08B 21/08* | (2006.01) |
| *G08B 25/10* | (2006.01) |
| *G08B 25/01* | (2006.01) |
| *G08B 25/12* | (2006.01) |
| *H04W 4/14* | (2009.01) |
| *H04W 84/04* | (2009.01) |
| *H04W 84/06* | (2009.01) |

(52) U.S. Cl.
CPC ......... *G08B 21/088* (2013.01); *G08B 25/016* (2013.01); *G08B 25/10* (2013.01); *G08B 25/12* (2013.01); *H04W 4/14* (2013.01); *H04W 84/042* (2013.01); *H04W 84/06* (2013.01)

(58) Field of Classification Search
CPC .................................. A61B 1/00; G06F 1/00
See application file for complete search history.

(56) References Cited

U.S. PATENT DOCUMENTS

| | | | |
|---|---|---|---|
| 4,714,914 A | | 12/1987 | Boe |
| 5,900,817 A | * | 5/1999 | Olmassakian ..... G08B 21/0263 340/573.1 |
| 6,362,778 B2 | | 3/2002 | Neher |
| 6,388,612 B1 | | 5/2002 | Neher |
| 7,015,817 B2 | | 3/2006 | Copley |
| 2008/0266118 A1 | * | 10/2008 | Pierson ................ A61B 5/0205 340/573.6 |
| 2008/0316022 A1 | | 12/2008 | Buck |
| 2010/0003958 A1 | * | 1/2010 | Ray ...................... G10L 13/043 455/404.2 |
| 2014/0124389 A1 | | 5/2014 | Borlenghi |

FOREIGN PATENT DOCUMENTS

WO          0163318 A1    8/2001

* cited by examiner

*Primary Examiner* — Shirley Lu

(57) ABSTRACT

The water activated GPS-based beacon is a radio based transmitter that is configured for outdoor activities. The water activated GPS-based beacon is a safety device that is worn during outdoor activities. The water activated GPS-based beacon is housed in a jewelry item that is worn during the outdoor activity. The water activated GPS-based beacon remains dormant until: 1) the water activated GPS-based beacon is immersed in water; or 2) a switch located on the jewelry item is activated. If either of these conditions occur, the water activated GPS-based beacon determines the GPS coordinates of the water activated GPS-based beacon and transmits the GPS coordinates to a previously determined appropriate authority. The water activated GPS-based beacon comprises the jewelry item and a beacon.

3 Claims, 6 Drawing Sheets

WATER ACTIVATED GPS-BASED BEACON

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments including radio navigation, more specifically, a transmitting beacon intended to be received by a non-directional receiver.

SUMMARY OF INVENTION

The water activated GPS-based beacon is a radio-based transmitter that is configured for outdoor activities. The water activated GPS-based beacon is a safety device that is worn during outdoor activities. The water activated GPS-based beacon is housed in a jewelry item that is worn during the outdoor activity. The water activated GPS-based beacon remains dormant until: 1) the water activated GPS-based beacon is immersed in water; or 2) a switch located on the jewelry item is activated. If either of these conditions occur, the water activated GPS-based beacon determines the GPS coordinates of the water activated GPS-based beacon and transmits the GPS coordinates to a previously determined appropriate authority. The water activated GPS-based beacon comprises the jewelry item and a beacon.

These together with additional objects, features and advantages of the water activated GPS-based beacon will be readily apparent to those of ordinary skill in the art upon reading the following detailed description of the presently preferred, but nonetheless illustrative, embodiments when taken in conjunction with the accompanying drawings.

In this respect, before explaining the current embodiments of the water activated GPS-based beacon in detail, it is to be understood that the water activated GPS-based beacon is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the water activated GPS-based beacon.

It is therefore important that the claims be regarded as including such equivalent construction insofar as they do not depart from the spirit and scope of the water activated GPS-based beacon. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
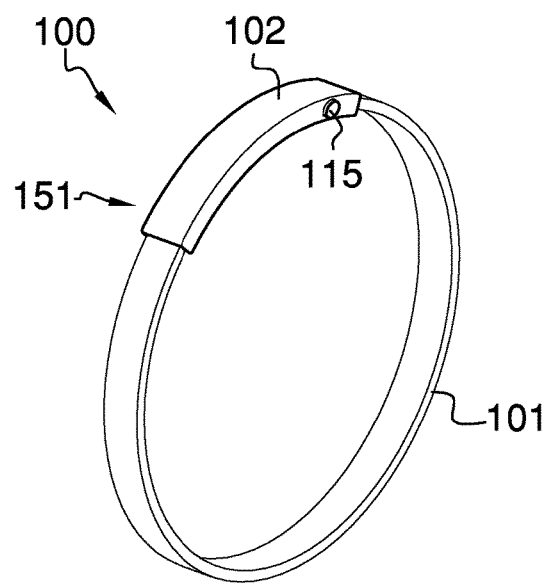
FIG. 1 is a perspective view of an embodiment of the disclosure.
Figure 2:
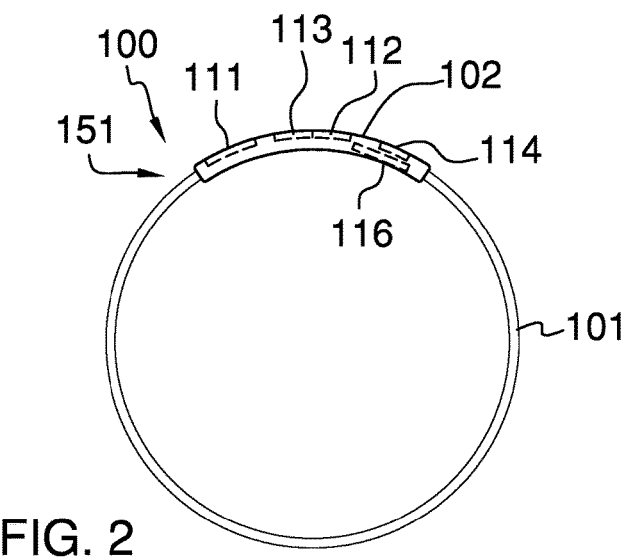
FIG. 2 is a rear view of an embodiment of the disclosure.
Figure 3:
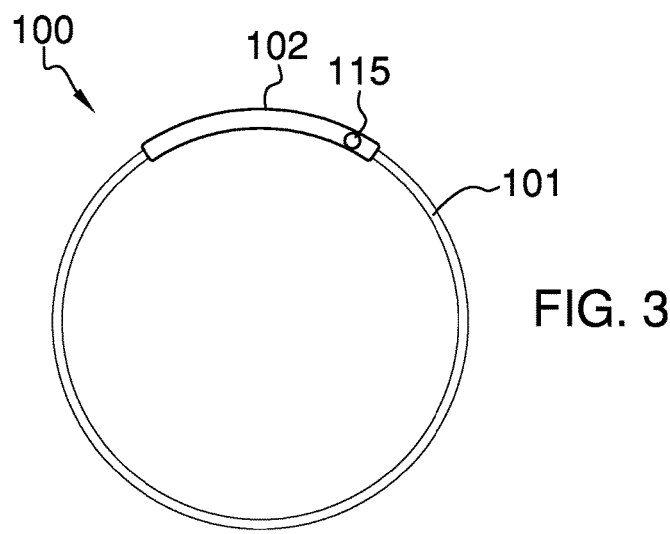
FIG. 3 is a front view of an embodiment of the disclosure.
Figure 4:
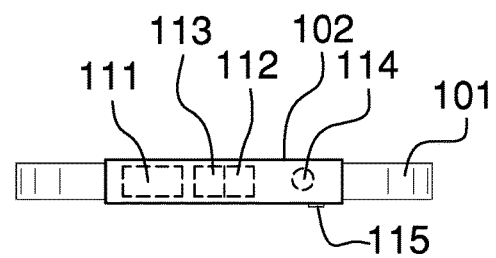
FIG. 4 is a top view of an embodiment of the disclosure.
Figure 5:
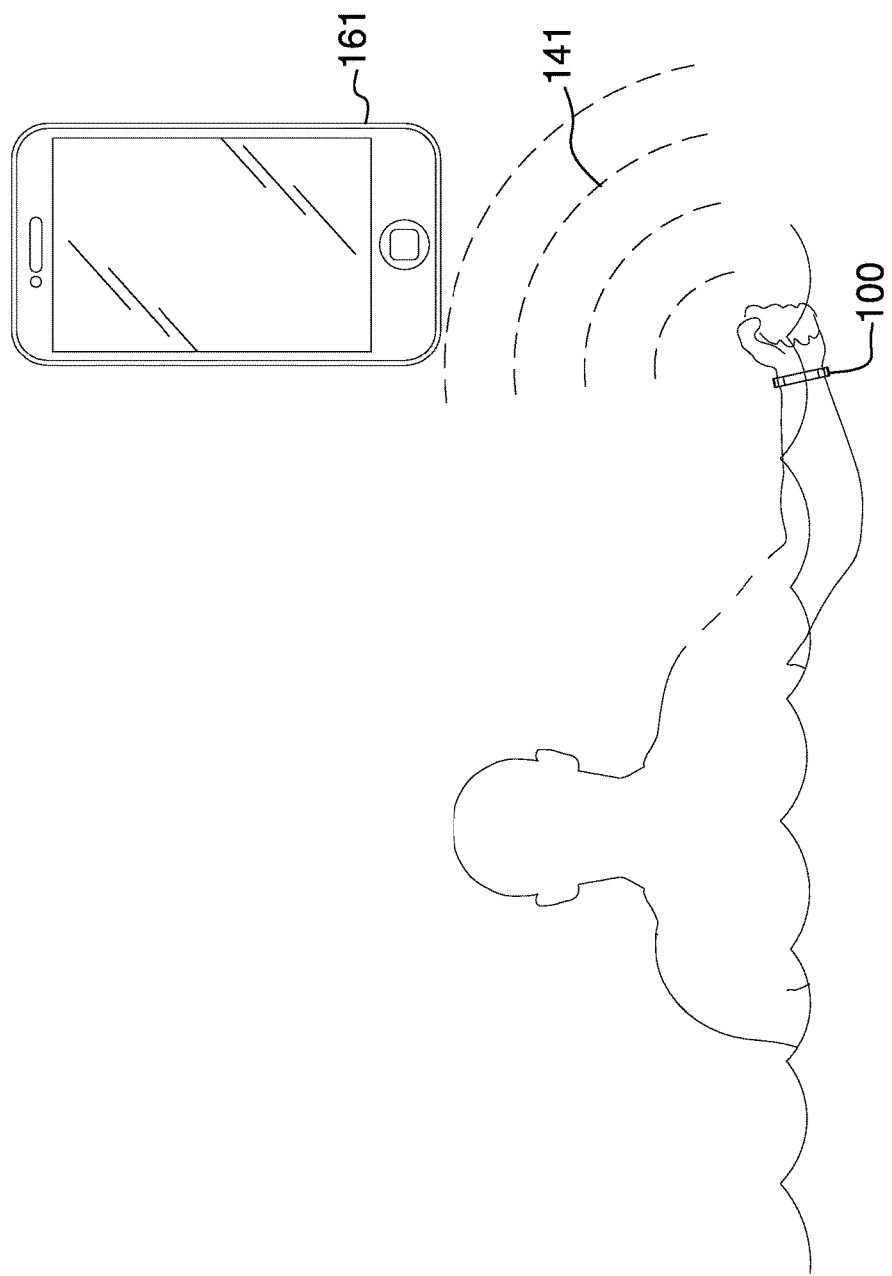
FIG. 5 is an in use view of an embodiment of the disclosure.
Figure 6:
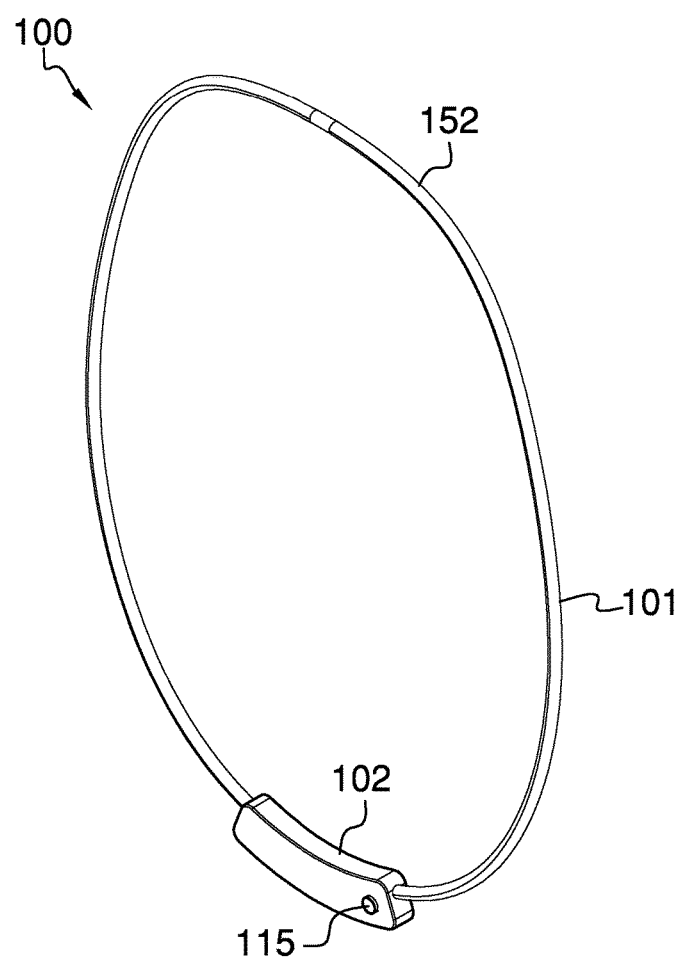
FIG. 6 is a perspective view of an alternate embodiment of the disclosure.
Figure 7:
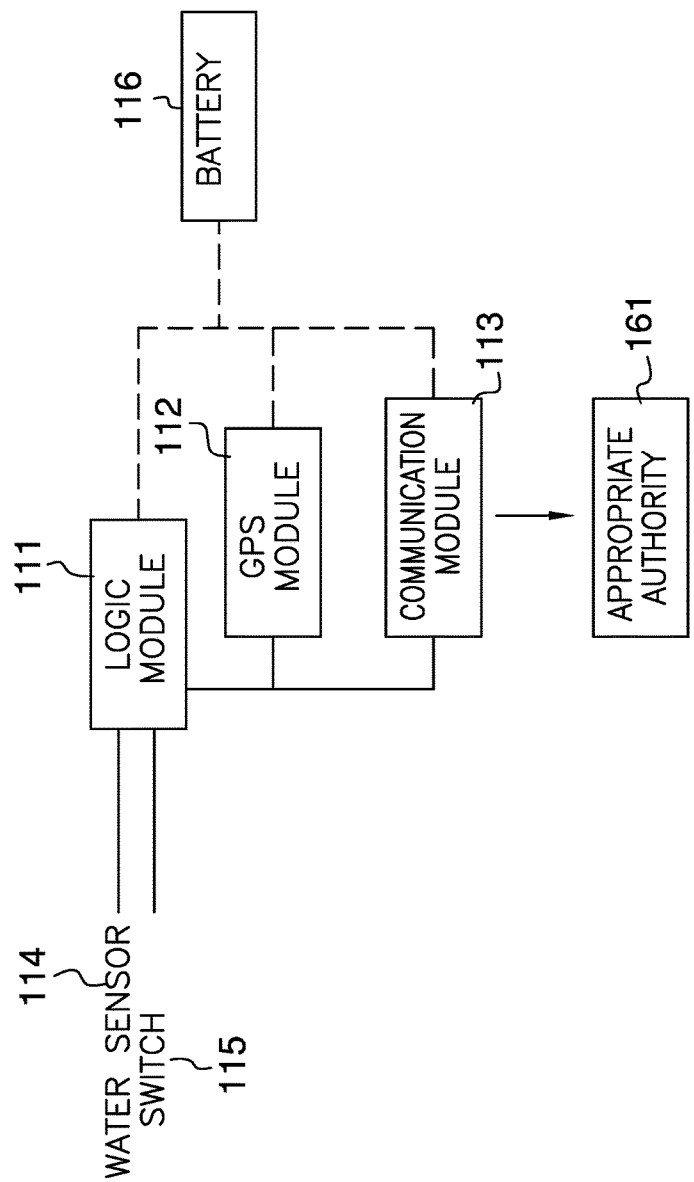
FIG. 7 is a block diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The water activated GPS-based beacon 100 (hereinafter invention) is a radio-based transmitter that is configured for outdoor activities. The invention 100 is a safety device that is worn during outdoor activities. The invention 100 is housed in a jewelry item 101 that is worn during the outdoor activity. The invention 100 remains dormant until: 1) the invention 100 is immersed in water; or 2) a switch 115 located on the jewelry item 101 is activated. If either of these conditions occur, the invention 100 determines the GPS coordinates of the invention 100 and transmits a request for assistance including the GPS coordinates to a previously determined appropriate authority 161. The invention 100 comprises the jewelry item 101 and a beacon 102.

The jewelry item 101 is an accessory that is worn during the outdoor activity. The jewelry item 101 is a housing that contains the beacon 102. Methods to form housings in the fashion of jewelry are well known and documented in the jeweler's art. It is preferred that the jewelry item 101: 1) be worn directly on a person and not be attached to some other item worn by the person; and, 2) that the jewelry item 101 not be a watch.

In the first potential embodiment of the disclosure, the jewelry item 101 is selected from the group consisting of a bracelet 151 or a necklace 152. The bracelet 151 is an accessory that is worn around the wrist during outdoor activities. The necklace 152 is an accessory that is worn around the neck during outdoor activities.

The beacon 102 is a programmed electronic circuit that transmits a first message 141 requesting assistance that further contains the GPS coordinates of the invention 100. The transmission of the first message 141 is initiated by the detection of predetermined events. In the first potential embodiment of the disclosure, the predetermined events comprise: 1) the immersion of a water sensor 114 into water; and, 2) the closure of a switch 115. As shown most clearly in FIG. 7, the beacon 102 comprises a logic module 111, a GPS module 112, a communication module 113, a water sensor 114, a switch 115, and a battery 116.

The logic module 111 is a programmable electronic device that is used to manage, regulate, and operate the beacon 102. Depending on the specific design and the selected components, the logic module 111 can be a separate component within the in beacon 102 or the functions of the logic module 111 can be incorporated into another component within the beacon 102. The communication module 113 is a readily and commercially available wireless electronic communication device that allows the logic module 111 to send a first message 141 containing a request for assistance and the GPS coordinates of the GPS module 112 to a previously determined appropriate authority 161. The type of communication will depend on the intended use and location of the invention 100. The appropriate authority 161 is a predetermined person or organization that is designated to receive the first message 141 from the invention 100.

The logic module 111 is further defined with a timing circuit. The timing circuit is an electrical circuit within the logic module 111 that is used as a countdown timer. Timing circuits are well known and documented in the electrical arts.

The GPS module 112 is an electrical device that communicates with the GPS to determine the GPS coordinates of the GPS module 112. When queried by the logic module 111, the GPS module 112 transfers the GPS coordinates to the logic module 111.

In the first potential embodiment of the disclosure, the selected communication module 113 communicates SMS and MMS messages between the logic module 111 and the appropriate authority 161 through a commercially provided and publically available cellular wireless network. The use of a commercially provided and publically available cellular wireless network is preferred because: 1) of its low cost; 2) of its widespread availability and broad interoperability between competing publically available cellular wireless networks; and, 3) methods and techniques to send SMS and MMS messages over a publically available cellular wireless network are well known and documented by those skilled in the electrical arts. The first potential embodiment of the disclosure is appropriate for use in regions where cellular wireless networks are reliably available.

In the second potential embodiment of the disclosure, the selected communication module 113 communicates using the satellite messenger system. While the satellite messenger system is more expensive, the extended coverage available from the satellite network makes the second potential embodiment of the disclosure more appropriate in regions where cellular wireless networks are not reliably available.

The water sensor 114 is an electrical circuit that detects when the water sensor 114 is immersed in water. In the first potential embodiment of the disclosure, the water sensor 114 comprises two electrodes across which is a voltage potential. When the water sensor 114 is immersed in water, a current flows from between the two electrodes. This measurement of this current provides the indication that the water sensor 114 is immersed. In the first potential embodiment of the disclosure, the logic module 111 monitors the water sensor 114.

The switch 115 is a readily and commercially available electrical switch. In the first potential embodiment of the disclosure, the logic module 111 monitors the switch 115.

The battery 116 is a readily and commercially available battery. The battery 116 is a device that converts chemical potential energy into electrical energy that is consumed by the beacon 102.

Figure 8:
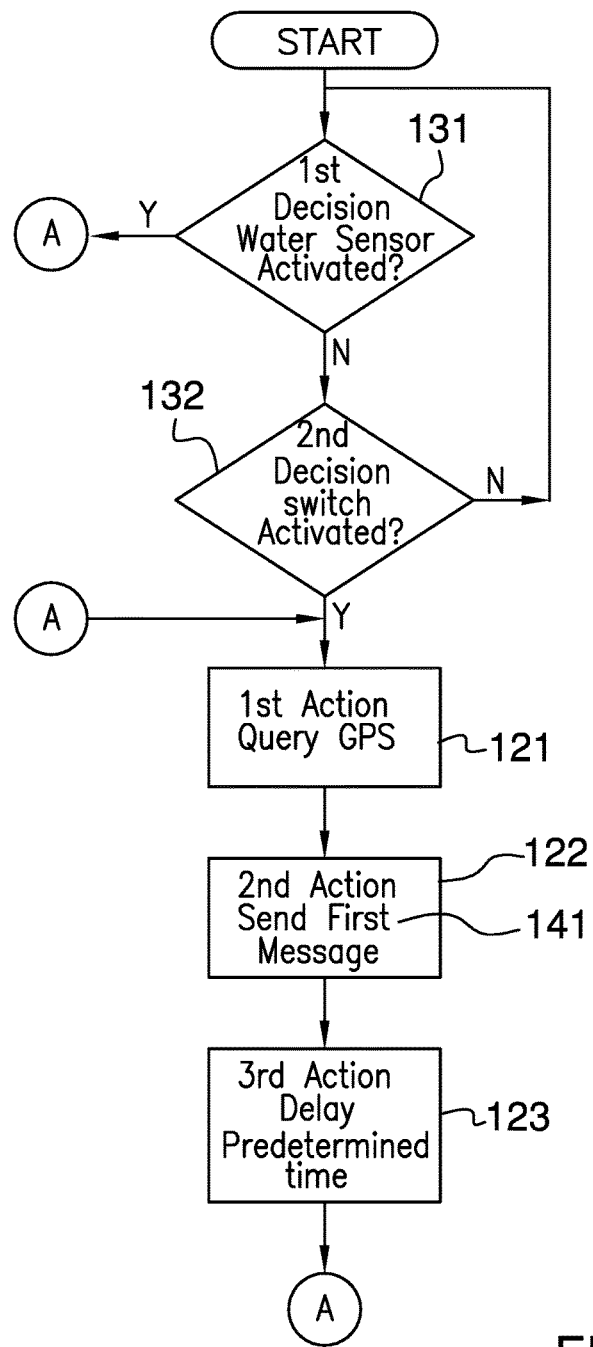
FIG. 8 is a flowchart of an embodiment of the disclosure.

The operation of the invention 100, as shown most clearly in FIG. 8, is described in this paragraph. The logic module 111 makes a first decision 131 to determine whether the water sensor 114 has been activated. If the water sensor 114 has been activated, the logic module 111 takes the first action 121. If the water sensor 114 has not been activated then the logic module 111 makes a second decision 132 to determine whether the switch 115 has been activated. If the switch 115 has not been activated the logic module 111 loops back to the first decision 131. If the switch 115 has been activated, the logic module 111 takes a first action 121 of querying the GPS module 112 to get the GPS coordinates of the GPS module 112. The logic module 111 takes a second action 122 of generating the first message 141, including the GPS coordinates, and transmitting the first message 141 through the communication module 113 to the appropriate authority 161. The logic module 111 takes a third action 123 of delaying for a predetermined amount of time and then looping back to the first action 121 such that a new first message 141 with updated GPS coordinates can be transmitted to the appropriate authority 161.

The following definitions were used in this disclosure:

Accessory: As used in this disclosure, an accessory is an object that adds to the convenience or attractiveness of, but is not required for the use of, a basic clothing set.

Appropriate Authority: As used in this disclosure, an appropriate authority is person or organization that is designated to receive alarm or other notification messages regarding a monitored system or activity.

Battery: As used in this disclosure, a battery is a container consisting of one or more cells, in which chemical energy is converted into electricity and used as a source of power.

Electrode: As used in this disclosure, an electrode is an electrical conductor through which electric current enters or exits a non-metallic object that is incorporated into an electric circuit. Non-metallic object commonly used with electrodes would include, but are not limited to electrolytic solutions, semiconducting materials, or patients in medical tests.

Exterior: As used in this disclosure, the exterior is use as a relational term that implies that an object is not contained within the boundary of a structure or a space.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Interior: As used in this disclosure, the interior is use as a relational term that implies that an object is contained within the boundary of a structure or a space.

Logic Module: As used in this disclosure, a logic module is an electrical device that is programmable and that accepts digital and analog inputs, processes the digital and analog inputs according to previously stored instruction and provides the results of these instructions as digital or analog outputs.

Satellite Messenger System: As used in this disclosure, a satellite messenger system is a commercially available tracking and communication system that uses the GPS to track the position of the user and allow a user to access a satellite based system to send text messages, including distress messages, to search and rescue authorities or other interested safety personnel.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services, which is abbreviated as MMS.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. An emergency transmitter comprising:
a jewelry item and a beacon;
wherein the emergency transmitter is a radio transmitter that is configured for outdoor activities;
wherein the emergency transmitter is configured for outdoor activities;
wherein the emergency transmitter is a safety device;
wherein the beacon is housed in the jewelry item;
wherein the emergency transmitter remains dormant until the emergency transmitter is immersed in water;
wherein the emergency transmitter remains dormant until the emergency transmitter is manually activated;
wherein the emergency transmitter determines the GPS coordinates of the emergency transmitter;
wherein the emergency transmitter transmits a request for assistance including the GPS coordinates to a previously determined appropriate authority;
wherein the appropriate authority is a predetermined person or organization that is designated to receive the transmitted request for assistance from the emergency transmitter;
wherein the communication module communicates using a satellite messenger system;
wherein the jewelry item is an accessory that is worn during the outdoor activity;
wherein the jewelry item is a housing that contains the beacon;
wherein the beacon is a programmed electronic circuit that transmits a first message;
wherein the first message requests assistance;
wherein the first message further comprises the GPS coordinates of the emergency transmitter;
wherein the beacon comprises a logic module, a GPS module, a communication module, a water sensor, a switch, and a battery;
wherein the GPS module, the communication module, the water sensor, and the switch are electrically connected to the logic module;
wherein the battery provides electric power to the logic module, the GPS module, the communication module, the water sensor, and the switch;
wherein the transmission of the first message is initiated by the detection one or more predetermined events;
wherein the one or more predetermined events comprises the immersion of the water sensor into water;
wherein the one or more predetermined events further comprises the change of the open/closed state of the switch;
wherein the logic module is a programmable electronic device;
wherein the logic module is further comprises with a timing circuit;
wherein the communication module is a wireless electronic communication device;
wherein the communication module enables the logic module to send the first message containing a request for assistance and the GPS coordinates of the GPS module to the previously determined appropriate authority;
wherein the GPS module is an electrical device that communicates with the GPS to determine the GPS coordinates of the GPS module;
wherein when queried by the logic module the GPS module transfers the GPS coordinates to the logic module;
wherein the water sensor is an electrical circuit that detects when the water sensor is immersed in water;
wherein the logic module makes a first decision to determine whether the water sensor has been activated;
wherein the logic module makes a second decision to determine whether the switch has been activated;

wherein the logic module takes a first action of querying the GPS module to get the GPS coordinates of the GPS module;

wherein the logic module takes a second action of generating the first message and transmitting the first message through the communication module to the previously determined appropriate authority;

wherein the logic module takes a third action of delaying for a predetermined amount of time and then looping back to the first action such that a new first message with updated GPS coordinates is transmitted to the previously determined appropriate authority.

2. The emergency transmitter according to claim 1 wherein the jewelry item is selected from the group consisting of a bracelet or a necklace.

3. The emergency transmitter according to claim 2 wherein the communication module communicates SMS and MMS messages between the logic module and the previously determined appropriate authority through a commercially provided and publically available cellular wireless network.

\* \* \* \* \*